United States Patent
Fuchino (10) Patent No.: US 8,339,746 B2
(45) Date of Patent: Dec. 25, 2012

(54) HEAD SUSPENSION WITH BASE PLATE HAVING FLANGE ALIGNED WITH AND ATTACHED TO AUXILIARY MEMBER

(75) Inventor: Hideki Fuchino, Aikoh-gun (JP)

(73) Assignee: NHK Spring Co., Ltd., Kanagawa (JP)

( * ) Notice: Subject to any disclaimer, the term of this patent is extended or adjusted under 35 U.S.C. 154(b) by 0 days.

(21) Appl. No.: 12/964,290

(22) Filed: Dec. 9, 2010

(65) Prior Publication Data

US 2011/0141625 A1 Jun. 16, 2011

(30) Foreign Application Priority Data

Dec. 10, 2009 (JP) ................................ P2009-280508

(51) Int. Cl.
*G11B 5/48* (2006.01)
(52) U.S. Cl. .................................... 360/244.6
(58) Field of Classification Search ............... 360/244.6, 360/245.2
See application file for complete search history.

(56) References Cited

U.S. PATENT DOCUMENTS

| 6,956,720 | B2 * | 10/2005 | Takagi et al. | ............... 360/244.6 |
| 2003/0128473 | A1 * | 7/2003 | Takagi et al. | ............... 360/244.6 |

* cited by examiner

*Primary Examiner* — David D Davis
(74) *Attorney, Agent, or Firm* — Jordan and Hamburg LLP (57) ABSTRACT

A head suspension has a base plate including a flange. The flange has a first face attached to the carriage arm and a second face attached to an auxiliary member. A first-face contact is circumferentially formed along an outer circumferential edge of the first face of the flange, so that the first-face contact among parts of the base plate except the boss is most proximal to the carriage arm. A second-face contact is circumferentially formed along an outer circumferential edge of the second face of the flange, so that the second-face contact among parts of the base plate including the boss is most proximal to the auxiliary member. This configuration allows the auxiliary member to be correctly aligned with and attached to the second face of the flange.

10 Claims, 8 Drawing Sheets

HEAD SUSPENSION WITH BASE PLATE HAVING FLANGE ALIGNED WITH AND ATTACHED TO AUXILIARY MEMBER

BACKGROUND OF THE INVENTION

1. Field of the Invention

The present invention relates to a head suspension for supporting a magnetic head to read and write data in a hard disk drive.

2. Description of Related Art

The head suspension used for supporting a magnetic head in a hard disk drive generally has a base plate and a load beam. The base plate has a boss and supports the load beam that applies load onto the magnetic head.

The head suspension is attached to a carriage arm by joining the boss of the base plate to a hole of the carriage arm. The carriage arm is turnable around a spindle.

Correctly attaching the base plate to the carriage arm is very important for securing dynamic characteristics of the head suspension.

To correctly attach the head suspension to the carriage arm, Japanese Unexamined Patent Application Publication No. 2003-203448 teaches a head suspension having a base plate that includes a flange and a boss. The flange has a contact face to be brought in contact with a fitting face of a carriage arm. The boss is engaged with a hole of the carriage arm and is fixed thereto by plastic deformation when attaching the base plate to the carriage arm. At a corner between the boss and flange of the base plate, a recess is formed to define a gap with respect to the fitting face of the carriage arm.

This related art is capable of correctly attaching the contact face of the flange of the base plate to the fitting face of the carriage arm.

The related art, however, takes no account of a second face of the flange opposite to the contact face of the flange. The second face of the flange of the base plate is usually laid on a reinforcing plate as an auxiliary member and is fixed thereto by laser spot welding. At this time, if the second face of the flange is improperly aligned with the reinforcing plate, they will incorrectly be fixed together.

SUMMARY OF THE INVENTION

An object of the present invention is to provide a head suspension having a base plate whose flange is correctly aligned with and attached to an auxiliary member.

In order to accomplish the object, an aspect of the present invention provides a head suspension including a base plate to be attached to a carriage arm and a load beam supported with the base plate and configured to apply load onto a magnetic head slider at a front end thereof. The base plate has a flange and a boss, the flange having a first face attached to the carriage arm and a second face attached to an auxiliary member, the boss fitted into a hole of the carriage arm and fixed thereto by plastic deformation when attaching the base plate to the carriage arm. The head suspension also includes a first-face contact circumferentially formed along an outer circumferential edge of the first face of the flange, so that the first-face contact among parts of the base plate except the boss is most proximal to the carriage arm, and a second-face contact circumferentially formed along an outer circumferential edge of the second face of the flange, so that the second-face contact among parts of the base plate including the boss is most proximal to the auxiliary member.

According to this aspect of the present invention, the second face of the flange of the base plate is correctly aligned with and attached to the auxiliary member due to the presence of the second-face contact on the second face of the flange, thereby securing stable rigidity and dynamic characteristics for the head suspension.

DETAILED DESCRIPTION OF EMBODIMENTS

Head suspensions according to embodiments of the present invention will be explained in detail with reference to the drawings.

The head suspension according to any one of the embodiments can correctly aligned a base plate thereof with an auxiliary member to be attached to the base plate, to secure stable rigidity and dynamic characteristics. This is because the head suspension is provided with a first-face contact circumferentially formed along an outer circumferential edge of a first face of a flange of the base plate, so that the first-face contact among parts of the base plate except a boss of the base plate is most proximal to a carriage arm to which the base plate is attached. The head suspension is also provided with a second-face contact circumferentially formed along an outer circumferential edge of a second face of the flange, so that the second-face contact among parts of the base plate including the boss is most proximal to the auxiliary member to which the base plate is attached.

A head suspension according to the first embodiment of the present invention will be explained with reference to FIGS. 1 to 3.

Figure 1:
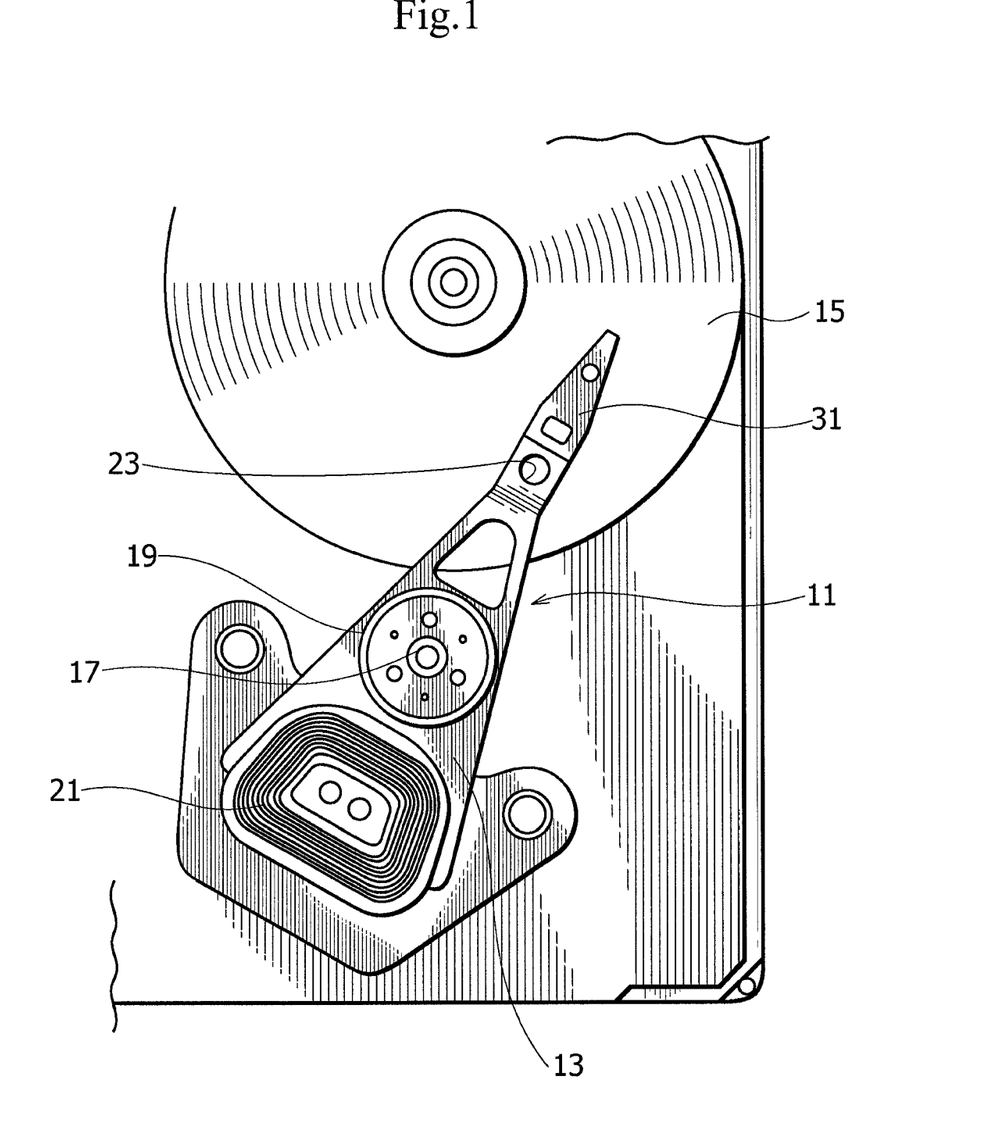
FIG. 1 is a plan view partly illustrating a hard disk drive in which an arm assembly including head suspensions is installed.
Figure 2:
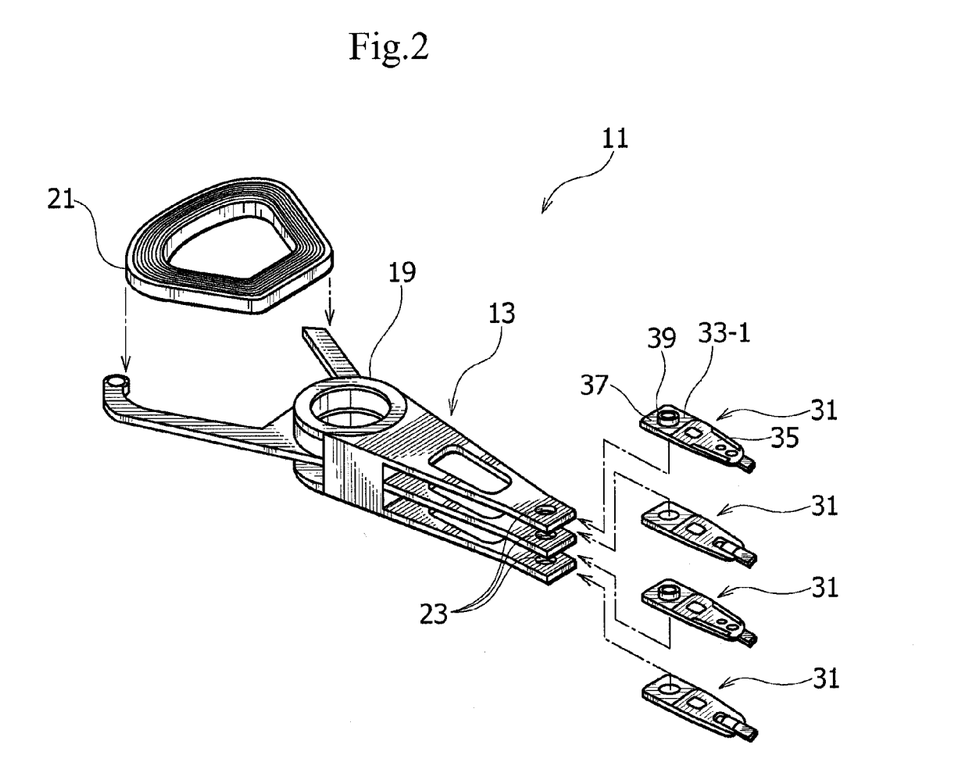
FIG. 2 is an exploded perspective view illustrating the arm assembly.
Figure 3:
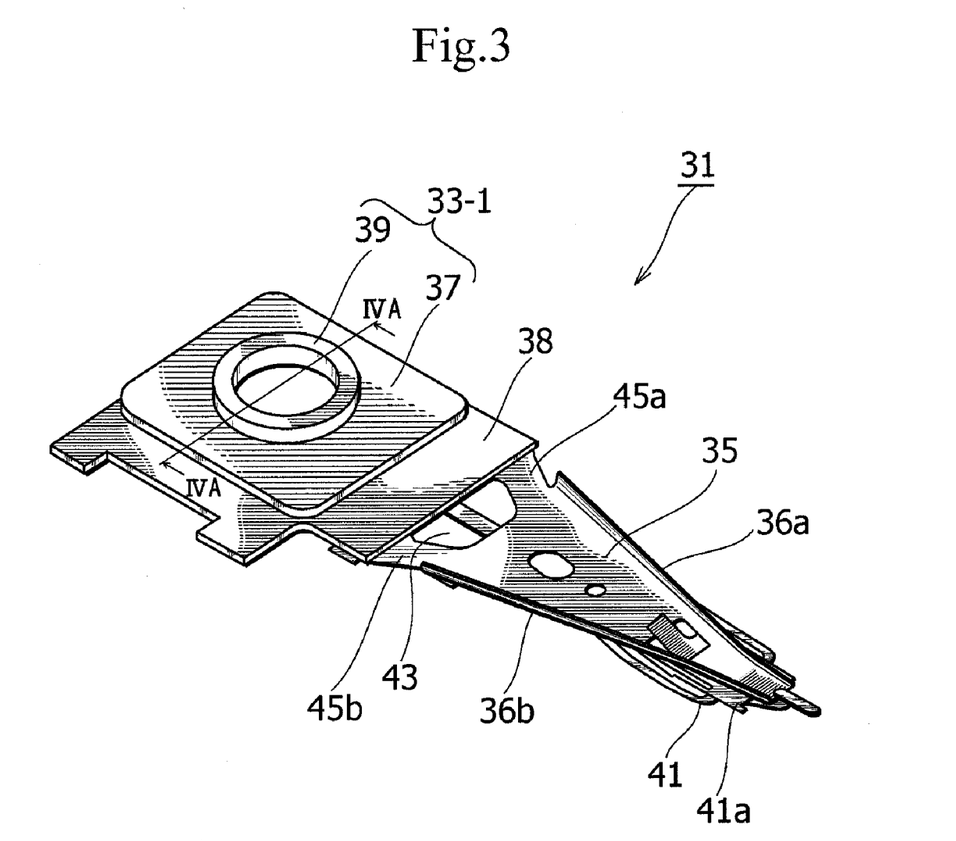
FIG. 3 is a perspective view illustrating a head suspension according to a first embodiment of the present invention.

FIG. 1 is a plan view partly illustrating a hard disk drive in which an arm assembly including head suspensions is installed, FIG. 2 is an exploded perspective view illustrating the arm assembly, and FIG. 3 is a perspective view illustrating the head suspension according to the first embodiment of the present invention.

In the following explanation, a base plate side of the head suspension is referred to as a base end side or a rear side and a load beam side of the head suspension as a front end side or a front side. A side of the head suspension opposite to a disk is referred to as a surface side and a side of the head suspension facing the disk as a back side or a bottom side. The disk is installed in the hard disk drive, for which the head suspension is arranged to read and write data.

In FIGS. 1 and 2, the arm assembly 11 is of a multi-arm type having three carriage arms 13. Each carriage arm 13 is provided with the head suspension 31 at a front end thereof. The arm assembly 11 of the multi-arm type is turnable around a spindle 17. Base ends of the carriage arms 13 are provided with a rotary bearing 19 and a voice coil motor (VCM) 21 and each carriage arm 13 has a hole 23 at a front end thereof.

In FIGS. 2 and 3, the head suspension 31 has a base plate 33-1 and a load beam 35.

The base plate 33-1 resiliently supports the load beam 35 and is, for example, a stainless steel thin plate having a thickness in the range of about 150 to 200 μm. The base plate 33-1 has a flange 37 and a boss 39. The flange 37 is rectangular in a plan view. The boss 39 protrudes from the flange 37 in a thickness direction.

The base plate 33-1 is fixed to the carriage arm 13 by fitting the boss 39 into the hole 23 of the carriage arm 13 and by plastic-deforming the boss 39. The base plate 33-1 is provided with a reinforcing plate 38. The reinforcing plate 38 is, for example, a stainless steel thin plate that is fixed to the base plate 33-1 by welding, adhesion, or the like.

In FIG. 3, the load beam 35 has a flexure 41 that is attached to a bottom surface of the load beam 35 by, for example, laser spot welding. The flexure 41 has a magnetic head slider 41a at a front end thereof and the load beam 35 applies load onto the magnetic head slider 41a. The load beam 35 is, for example, a resilient stainless steel thin plate having a thickness in the range of about 30 to 150 μm.

The load beam 35 has bent edges 36a and 36b along both lateral sides to improve rigidity of the load beam 35. A rear end of the load beam 35 has a hole 43 to reduce rigidity in a thickness direction. On each side of the hole 43, hinges 45a and 45b are formed to bend in a thickness direction. The top surface of the rear end of the load beam 35 is laid on a bottom surface of a front end of the reinforcing plate 38 and is fixed thereto by, for example, laser spot welding.

The base plate 33-1 of the head suspension 31 according to the first embodiment will be explained in detail with reference to FIGS. 4A, 4B, 5A, 5B and 6.

Figure 4A:
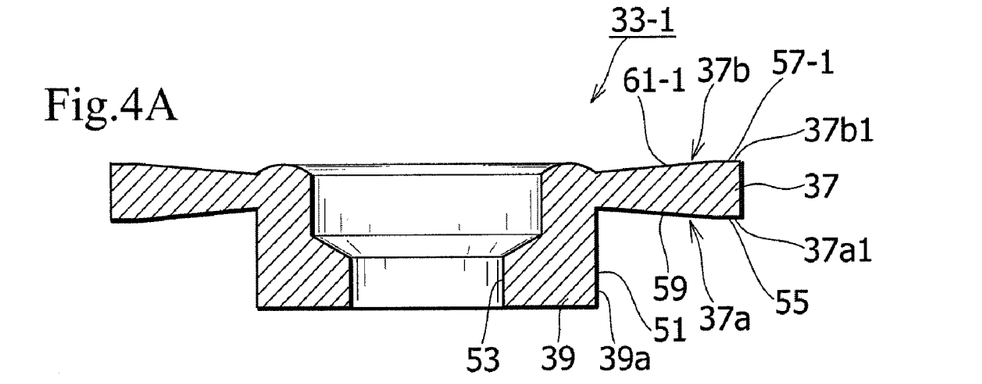
FIG. 4A is a sectional view taken along a line IVA-IVA of FIG. 3.
Figure 4B:
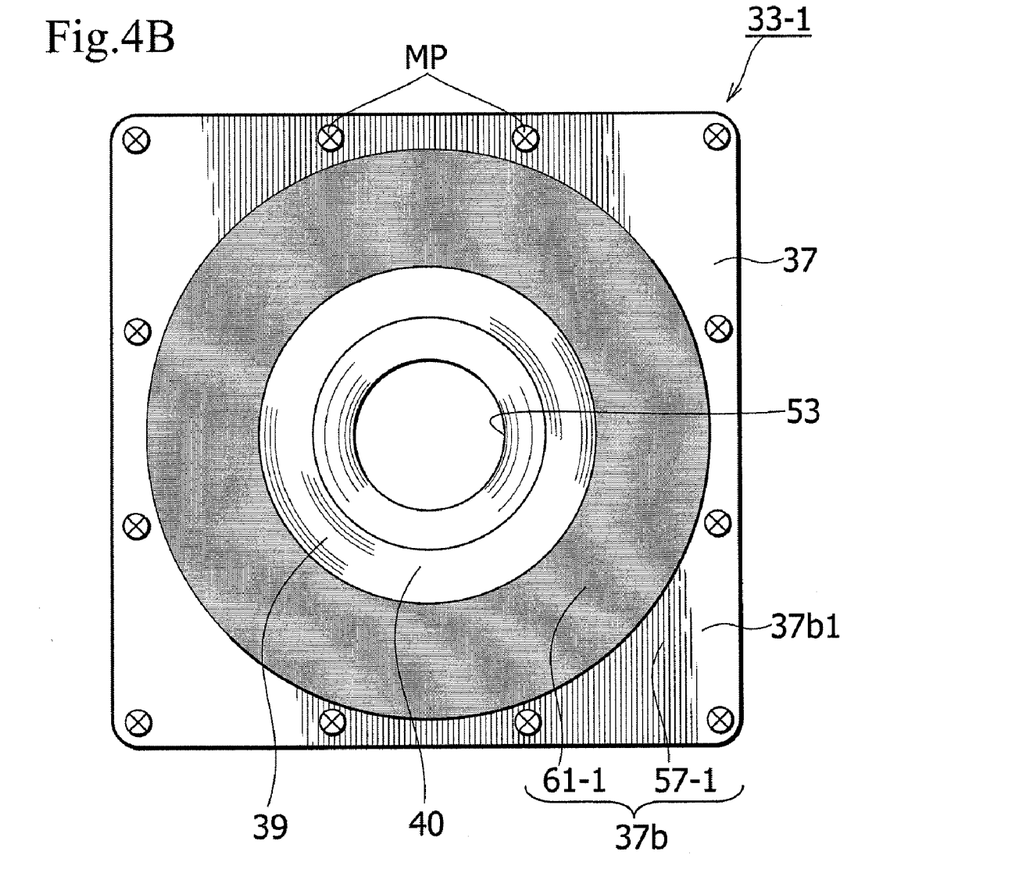
FIG. 4B is a plan view illustrating a base plate of the head suspension of FIG. 3.
Figure 5A:
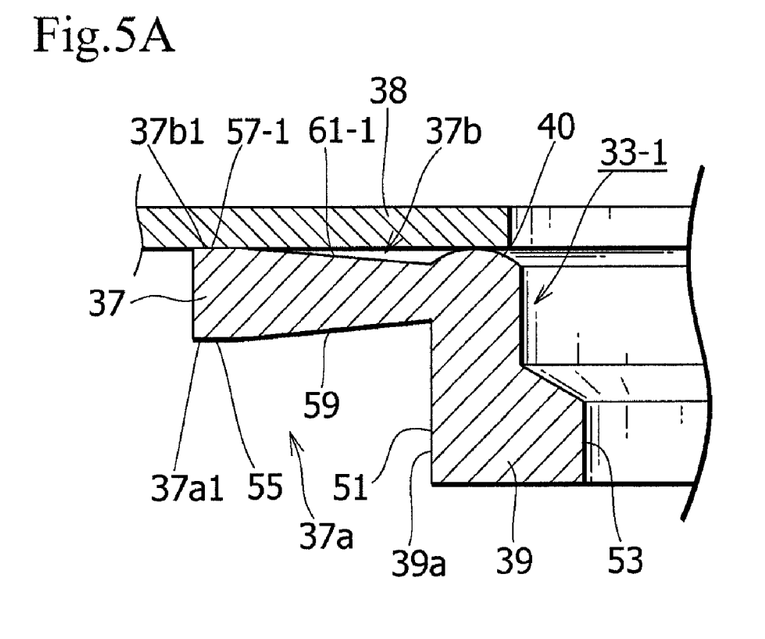
FIG. 5A is an enlarged sectional view illustrating a base plate part of the head suspension of FIG. 3.
Figure 5B:
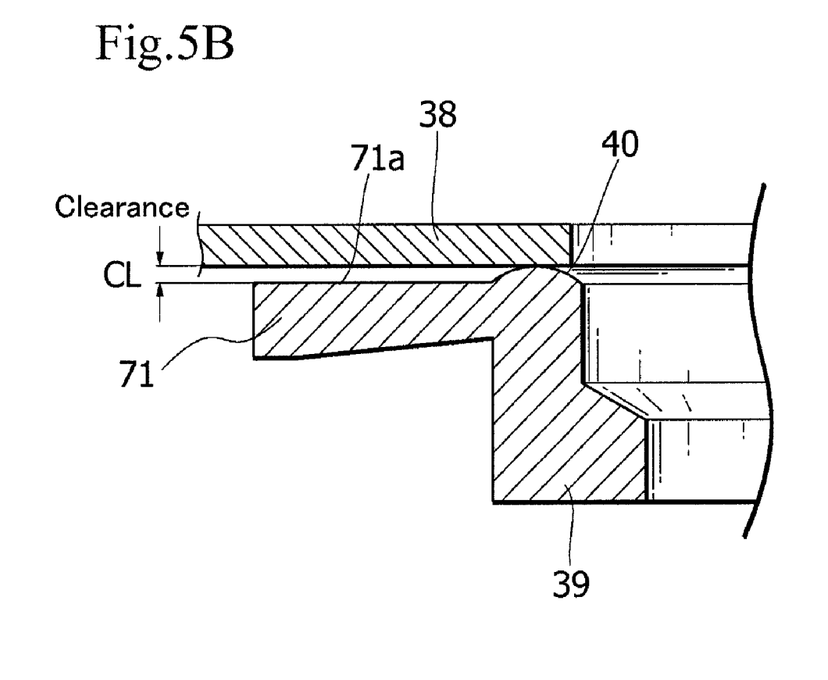
FIG. 5B is an enlarged sectional view illustrating a base plate part of a head suspension according to a comparative example.
Figure 6:
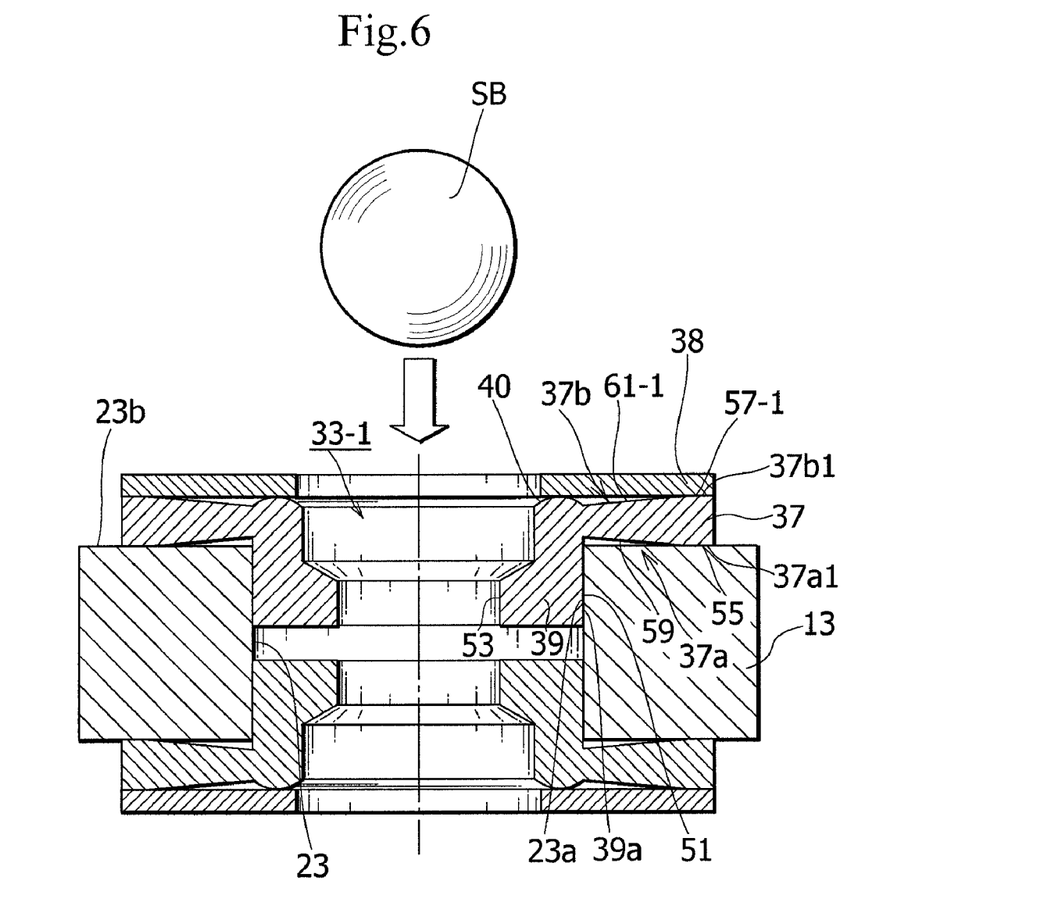
FIG. 6 is a sectional view illustrating a process of fitting the head suspension of FIG. 3 to a carriage arm.

FIG. 4A is a sectional view taken along a line IVA-IVA of FIG. 3, FIG. 4B is a plan view illustrating the base plate 33-1, FIG. 5A is an enlarged sectional view illustrating a base plate part of the head suspension 31, FIG. 5B is an enlarged sectional view illustrating a base plate part of a head suspension according to a comparative example, and FIG. 6 is a sectional view illustrating a process of fitting the head suspension 31 to the carriage arm 13.

The base plate 33-1 is formed by, for example, pressing a stainless steel thin material having a predetermined thickness. The pressing simultaneously forms the thin flange 37 and thick boss 39 of the base plate 33-1.

The boss 39 is cylindrical and protrudes from the flange 37 so that the boss 39 is engageable with the hole 23 of the carriage arm 13 as illustrated in FIGS. 4A, 4B, 5A and 6.

The boss 39 has an outer circumferential edge 39a along which a cylindrical fitting face 51 is formed. Inside the boss 39, there is formed a ball insertion hole 53 having a cylindrical shape.

The boss 39 is inserted into the hole 23 of the carriage arm 13 when attaching the head suspension 31 to the carriage arm 13. As illustrated in FIG. 6, the head suspension 31 is positioned with respect to the carriage arm 13 with the use of a jig. A steel ball SB whose diameter is larger than an inner diameter of the insertion hole 53 of the boss 39 is pushed into the insertion hole 53, to diametrically expand the boss 39 by plastic deformation. As a result, the fitting face 51 of the boss 39 is pressed to an inner circumferential face 23a of the carriage arm 13, thereby fixing the base plate 33-1 to the carriage arm 13. Consequently, the head suspension 31 is attached to the carriage arm 13 with the boss 39 fitted in the hole 23 of the carriage arm 13.

The flange 37 of the base plate 33-1 has a first face 37a that is connected to the carriage arm 13 and a second face 37b that is connected to an auxiliary member such as a reinforcing plate 38 as illustrated in FIGS. 4A, 4B, 5A and 6. The flange 37 is formed as thin as possible in order to reduce the weight thereof.

The flange 37 is provided with a first-face contact 55 and a second-face contact 57-1. The first-face contact 55 is circumferentially formed along an outer circumferential edge 37a1 of the first face 37a of the flange 37, so that the first-face contact 55 among parts of the base plate 33-1 except the boss 39 is most proximal to the carriage arm 13 when the base plate 33-1 is attached to the carriage arm 13. The second-face contact 57-1 is circumferentially formed along an outer circumferential edge 37b1 of the second face 37b of the flange 37, so that the second-face contact 57-1 among parts of the base plate 33-1 including the boss 39 is most proximal to the reinforcing plate (auxiliary member) 38 when the base plate 33-1 is attached to the reinforcing plate 38.

A vertical section of the flange 37 is gradually widened from the boss 39 toward the outer circumferential edges 37a1 and 37b1 without sharply changing the thickness of the flange 37. As a result, the flange 37 has a frame-like thick part along the outer circumferential edges 37a1 and 37b1, to improve rigidity of the flange 37.

The first face 37a of the flange 37 includes a first-face incline 59 that is circular and circumferential and a first-face flat 55 that corresponds to the first-face contact and is circumferential. The first-face flat (first-face contact) 55 corresponds to an area obtained by subtracting the first-face incline 59 from the first face 37a of the flange 37.

The second face 37b of the flange 37 includes a second-face incline 61-1 that is circular and circumferential and a second-face flat 57-1 that corresponds to the second-face contact and is circumferential. The second-face flat (second-face contact) 57-1 corresponds to an area obtained by subtracting the second-face incline 61-1 from the second face 37b of the flange 37.

The first-face flat (first-face contact) 55 allows the first face 37a of the flange 37 to be correctly and tightly fitted to a fitting face 23b of the carriage arm 13, as illustrated in FIG. 6.

The second-face flat (second-face contact) 57-1 allows the second face 37b of the flange 37 to be correctly and tightly fitted to the reinforcing plate (auxiliary member) 38, as illustrated in FIGS. 5A and 6. The flange 37 is fixed to the reinforcing plate 38 by, for example, laser spot welding at positions MP (FIG. 4B) on the second-face flat 57-1.

When manufacturing the base plate 33-1, the first- and second-face contacts 55 and 57-1 and the first- and second-face inclines 59 and 61-1 are simultaneously formed by press working. Accordingly, the base plate 33-1 that is compatibly provided with the thin flange 37, thick boss 39, first- and second-face contacts 55 and 57-1, and first- and second-face inclines 59 and 61-1 is easy to produce. It is possible to employ etching for forming the first- and second-face contacts 55 and 57-1 and first- and second-face inclines 59 and 61-1.

During the process of forming the boss 39 on the base plate 33-1 by press working, a circumferential bulge 40 is usually created between the flange 37 and the boss 39 as illustrated in FIGS. 4A, 4B, and 5A.

Such a bulge 40 causes a problem in a conventional base plate illustrated as a comparative example in FIG. 5B. In FIG. 5B, the bulge 40 causes a clearance CL between a flange 71 and a reinforcing plate (auxiliary member) 38. The clearance CL causes improper alignment and contact between a face 71a of the flange 71 and the reinforcing plate 38 when the base plate is laid on and fixed to the reinforcing plate 38.

To deal with this problem, the first embodiment forms the second-face contact 57-1 along the outer circumferential edge 37b1 of the second face 37b of the flange 37, so that the second-face contact 57-1 among parts of the base plate 33-1 including the boss 39 is most proximal to the reinforcing plate (auxiliary member) 38 when the base plate 33-1 is attached to the reinforcing plate 38, as well as the first-face contact 55 along the outer circumferential edge 37a1 of the first face 37a of the flange 37, so that the first-face contact 55 among parts of the base plate 33-1 except the boss 39 is most proximal to the carriage arm 13 when the base plate 33-1 is attached to the carriage arm 13. As a result, the reinforcing plate 38 is correctly aligned with and attached to the second face 37b of the flange 37, to secure proper stability, rigidity, and dynamic characteristics for the head suspension 31.

According to the first embodiment, a vertical section of the flange 37 is gradually widened from the boss 39 toward the outer circumferential edges 37a1 and 37b1 without sharply changing the thickness of the flange 37. As a result, the flange 37 has a frame-like thick part along the outer circumferential edges 37a1 and 37b1, to improve rigidity of the flange 37.

According to the first embodiment, the first-face flat (first-face contact) 55 is formed in flat and circumference and allows the first face 37a of the flange 37 to be correctly and tightly fitted to the fitting face 23b of the carriage arm 13.

According to the first embodiment, the second-face flat (second-face contact) 57-1 allows the second face 37b of the flange 37 to be correctly and tightly fitted to the reinforcing plate (auxiliary member) 38. The flange 37 is fixed to the reinforcing plate 38 by, for example, laser spot welding at given positions on the second-face flat 57-1.

According to the first embodiment, the base plate 33-1 is reinforced with the reinforcing plate 38 and the load beam 35 is supported by the base plate 33-1 through the reinforcing plate 38, to form the head suspension 31. This realizes a preferred embodiment of the head suspension.

Figure 7A:
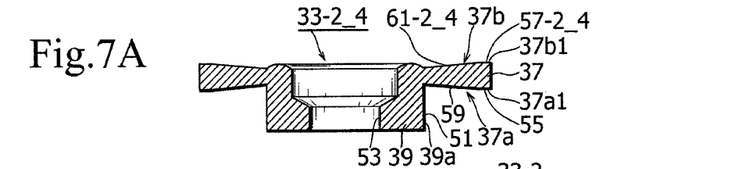
FIG. 7A is a sectional view partly illustrating a base plate of a head suspension according to second to fourth embodiments of the present invention.
Figure 7B:
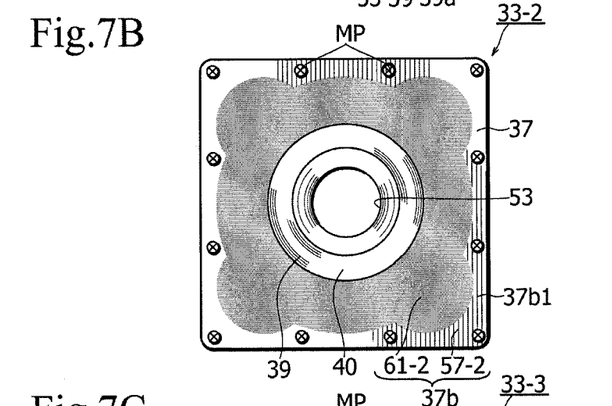
FIG. 7B is a plan view illustrating the base plate according to the second embodiment of the present invention.

A head suspension according to the second embodiment of the present invention will be explained with reference to FIGS. 7A and 7B in which FIG. 7A is a sectional view partly illustrating a base plate of a head suspension and FIG. 7B is a plan view illustrating the base plate.

The head suspension of the second embodiment is basically the same as the head suspension 31 of the first embodiment except the configuration of a base plate. Accordingly, only the characteristic part of the second embodiment, i.e., the base plate 33-2 will be explained in comparison with the first embodiment.

According to the first embodiment, the base plate 33-1 has the rectangular flange 37 and the second face 37b of the flange 37 includes the second-face incline 61-1 that is circular and circumferential and the second-face flat (second-face contact) 57-1 that is circumferential, as illustrated in FIGS. 4A and 4B.

On the other hand, the base plate 33-2 of the second embodiment has a rectangular flange 37 that is provided with a second face 37b including a second-face incline 61-2 and a second-face flat (second-face contact) 57-2. As illustrated in FIG. 7B, the second-face incline 61-2 has a petal-like shape and is circumferential and the second-face flat 57-2 is circumferential. Namely, the shape and area of the second-face flat 57-2 of the second embodiment differ from those of the second-face flat 57-1 of the first embodiment.

The base plate 33-2 of the second embodiment is manufacturable by press working like the base plate 33-1 of the first embodiment.

The head suspension with the base plate 33-2 according to the second embodiment allows a reinforcing plate (auxiliary member) 38 to be correctly aligned with, attached to and fixed to the second face 37b of the flange 37 so that the head suspension as a whole secures stable rigidity and dynamic characteristics.

Figure 7C:
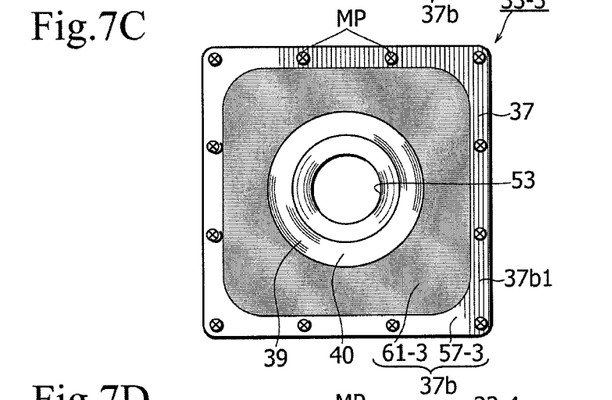
FIG. 7C is a plan view illustrating the base plate according to the third embodiment of the present invention.

A head suspension according to the third embodiment of the present invention will be explained with reference to FIG. 7C that is a plan view illustrating the base plate as well as FIG. 7A.

The head suspension of the third embodiment is basically the same as the head suspension 31 of the first embodiment except the configuration of a base plate. Accordingly, only the characteristic part of the third embodiment, i.e., the base plate 33-3 will be explained in comparison with the first embodiment.

According to the first embodiment, the base plate 33-1 has the rectangular flange 37 and the second face 37b of the flange 37 includes the second-face incline 61-1 that is circular and circumferential and the second-face flat (second-face contact) 57-1 that is circumferential, as illustrated in FIGS. 4A and 4B.

On the other hand, the base plate 33-3 of the third embodiment has a rectangular flange 37 that is provided with a second face 37b including a second-face incline 61-3 and a second-face flat (second-face contact) 57-3. As illustrated in FIG. 7C, the second-face incline 61-3 is rectangular and circumferential and the second-face flat 57-3 is circumferential. Namely, the shape and area of the second-face flat 57-3 of the third embodiment differ from those of the second-face flat 57-1 of the first embodiment.

The base plate 33-3 of the third embodiment is manufacturable by press working like the base plate 33-1 of the first embodiment.

The head suspension with the base plate 33-3 according to the third embodiment allows a reinforcing plate (auxiliary member) 38 to be correctly aligned with, attached to and fixed to the second face 37b of the flange 37 so that the head suspension as a whole secures stable rigidity and dynamic characteristics.

Figure 7D:
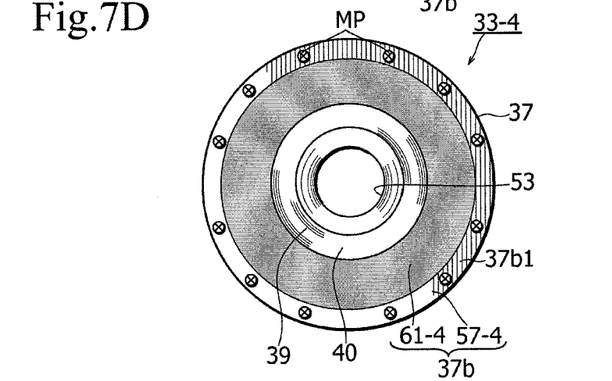
FIG. 7D is a plan view illustrating the base plate according to the fourth embodiment of the present invention.

A head suspension according to the fourth embodiment of the present invention will be explained with reference to FIG. 7D that is a plan view illustrating the base plate as well as FIG. 7A.

The head suspension of the fourth embodiment is basically the same as the head suspension 31 of the first embodiment except the configuration of a base plate. Accordingly, only the characteristic part of the fourth embodiment, i.e., the base plate 33-4 will be explained in comparison with the first embodiment.

According to the first embodiment, the base plate 33-1 has the rectangular flange 37 and the second face 37b of the flange 37 includes the second-face incline 61-1 that is circular and circumferential and the second-face flat (second-face contact) 57-1 that is circumferential, as illustrated in FIGS. 4A and 4B.

On the other hand, the base plate 33-4 of the fourth embodiment has a circular flange 37 that is provided with a second face 37b including a second-face incline 61-4 and a second-face flat (second-face contact) 57-4. As illustrated in FIG. 7D, the second-face incline 61-4 is circular and circumferential and the second-face flat 57-4 is circular and circumferential. Namely, the shape and area of the second-face flat 57-4 of the fourth embodiment differ from those of the second-face flat 57-1 of the first embodiment.

The base plate 33-4 of the fourth embodiment is manufacturable by press working like the base plate 33-1 of the first embodiment.

The head suspension with the base plate 33-4 according to the fourth embodiment allows a reinforcing plate (auxiliary member) 38 to be correctly aligned with, attached to and fixed to the second face 37b of the flange 37 so that the head suspension as a whole secures stable rigidity and dynamic characteristics.

Although the present invention has been explained with reference to the first to fourth embodiments, the present invention is not limited to these embodiments. The embodiments are modifiable based on the teachings described herein without departing from the gist and technical idea suggested herein. Head suspensions according to such modifications also fall in the scope of the present invention.

For example, the auxiliary member attached to the second face 37b of the flange 37 of the base plate is not limited to the reinforcing plate 38 but it may be any element.

Figure 8:
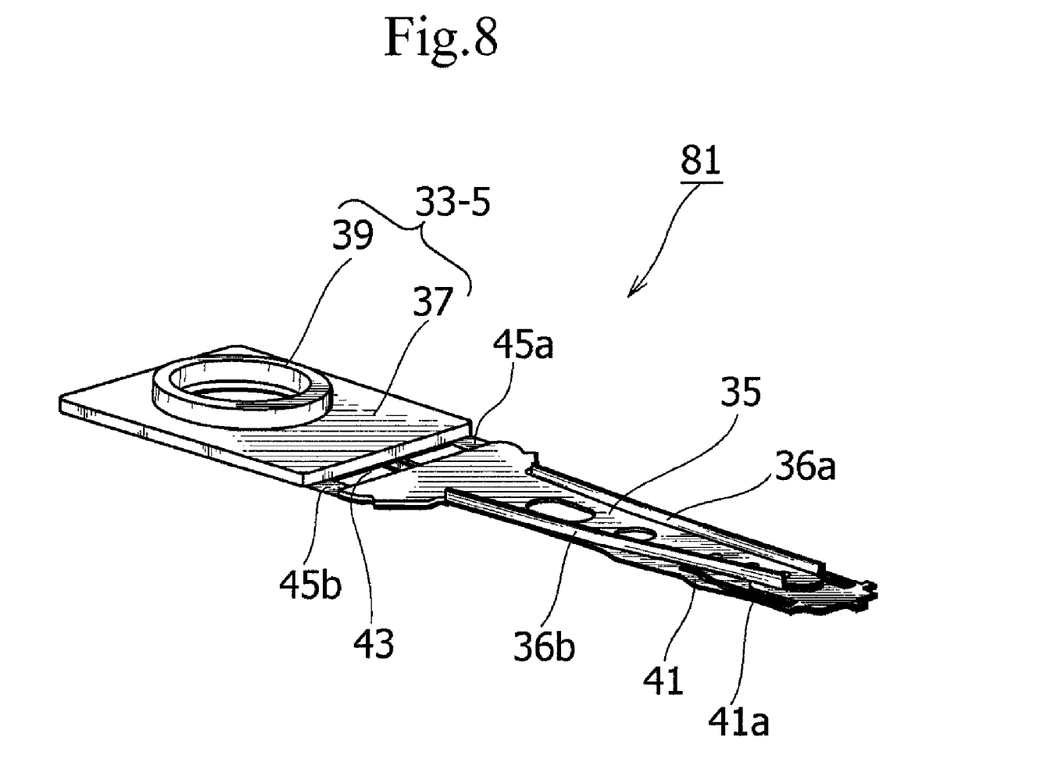
FIG. 8 is a perspective view illustrating a head suspension according to a modification of the first embodiment.

FIG. 8 is a perspective view illustrating a head suspension 81 according to a modification of the first embodiment of the present invention. Instead of the reinforcing plate 38, this modification attaches as an auxiliary member a rear end of a load beam 35 to a base plate 33-5.

What is claimed is:

1. A head suspension having a base plate to be attached to a carriage arm and a load beam supported with the base plate and configured to apply load onto a magnetic head slider at a front end thereof, the head suspension comprising:
   the base plate having a flange and a boss;
   the flange having a first face attached to the carriage arm and a second face opposite to the first face attached to an auxiliary member, the boss fitted into a hole of the carriage arm and fixed thereto by plastic deformation when attaching the base plate to the carriage arm;
   a first-face contact circumferentially formed along an outer circumferential edge of the first face of the flange, so that the first-face contact among parts of the base plate except the boss is most proximal to the carriage arm; and
   a second-face contact circumferentially formed along an outer circumferential edge of the second face of the flange, so that the second-face contact protrudes toward the auxiliary member with respect to other parts on the second face of the base plate including the boss so as to be most proximal to the auxiliary member, thereby contacting the second-face contact to the auxiliary member to prevent the other parts on the second face from coming into contact with the auxiliary member.

2. The head suspension of claim 1, wherein a vertical section of the flange is gradually widened from the boss toward the outer circumferential edges.

3. The head suspension of claim 1, wherein the first-face contact and second-face contact are each a circumferential flat area.

4. The head suspension of claim 1, wherein the auxiliary member is a reinforcing plate configured to reinforce the base plate, and
   the load beam is supported by the base plate through the reinforcing plate.

5. The head suspension of claim 1, wherein the auxiliary member is the load beam.

6. The head suspension of claim 1, wherein the second-face contact is formed in any one of a circular shape, rectangular shape, and petal-like shape.

7. The head suspension of claim 1, wherein a spacing between the second face and the auxiliary member gradually increases from the second face contact radially inward along a portion of the second face toward the boss.

8. A head suspension having a base plate to be attached to a carriage arm and a load beam supported with the base plate and configured to apply load onto a magnetic head slider at a front end thereof, the head suspension comprising:
   the base plate having a flange and a boss;
   the flange having a first face attached to the carriage arm and a second face opposite to the first face attached to an auxiliary member, the boss fitted into a hole of the carriage arm and fixed thereto by plastic deformation when attaching the base plate to the carriage arm;
   a first-face contact circumferentially formed along an outer circumferential edge of the first face of the flange, so that the first-face contact among parts of the base plate except the boss is most proximal to the carriage arm; and
   a second-face contact circumferentially formed along an outer circumferential edge of the second face of the flange, so that the second-face contact protrudes toward the auxiliary member with respect to other parts on the second face of the base plate, wherein no spacing occurs between the second face and the auxiliary member at the second face contact, and wherein spacing does occur between the second face and the auxiliary member radially inward of the second face contact along a portion of the second face toward the boss.

9. The head suspension of claim 8, wherein said spacing between the second face and the auxiliary member increases radially inward of the second face contact along said portion of the second face toward the boss.

10. The head suspension of claim 8, wherein a vertical section of the flange is gradually widened from the boss toward the outer circumferential edges.

* * * * *